United States Patent [19]

Yunoki et al.

[11] Patent Number: 5,408,684
[45] Date of Patent: Apr. 18, 1995

[54] CONTROL CHANNEL SELECTING METHOD FOR MOBILE STATIONS

[75] Inventors: Kazufumi Yunoki; Katsumi Kobayashi; Kiyohito Nagata, all of Yokohama, Japan

[73] Assignee: NTT Mobile Communications Network, Inc., Tokyo, Japan

[21] Appl. No.: 114,174

[22] Filed: Sep. 1, 1993

[30] Foreign Application Priority Data

Sep. 21, 1992 [JP] Japan ................... 4-251277

[51] Int. Cl.⁶ .................. H04B 7/26; H04Q 7/22; H04Q 7/38
[52] U.S. Cl. ................... 455/34.2; 455/33.1; 455/56.1; 455/62
[58] Field of Search .................... 455/33.1, 33.2, 33.4, 455/34.1, 54.1, 54.2, 56.1, 62, 34.2; 379/58, 59, 61

[56] References Cited

U.S. PATENT DOCUMENTS 4,750,198 6/1988 Harper ........................... 379/59
4,903,320 2/1990 Hanawa ........................ 455/34.2

FOREIGN PATENT DOCUMENTS 1-170232 7/1989 Japan ............................ 455/34.2

OTHER PUBLICATIONS

"Quick Call Scan Algorithm", by B. Moselle et al, Motorola Tech. Dev., vol. 16, Aug. 1992.

Primary Examiner—Reinhard J. Eisenzopf
Assistant Examiner—Chi H. Pham
Attorney, Agent, or Firm—Pollock, VandeSande and Priddy

[57] ABSTRACT

In the selection of a control channel of a mobile station in a radio zone to which some control channels are assigned as communication channels, the receiving levels of the control channels are sequentially measured and control channel candidates are selected. A check is made to see if a control signal can correctly be received in each of the selected control channel candidates, and if not, the number of signal reception failures in that channel is incremented by 1 in a memory used by the mobile rotation. A channel in which the number of signal reception failures has reached a predetermined value M (an integer equal to or greater than 1) is excluded from the group of control channel candidates, and the other selected control channel candidates are similarly checked to determine whether or not the reception of the control signal is possible in each of them. If the control signal can correctly be received in a given control channel, a check is made to see if the mobile station has moved into a different radio zone, and if not, the mobile station enters the state of waiting for an incoming call in that control channel. If the radio zone of the mobile station has changed, the numbers of signal reception failures in all the control channels are reset in the memory, so that all the control channels are made candidates to be selected next as a control channel of the radio zone in which the mobile station is currently located.

6 Claims, 6 Drawing Sheets

CONTROL CHANNEL SELECTING METHOD FOR MOBILE STATIONS

BACKGROUND OF THE INVENTION

The present invention relates to a control channel selecting method for mobile stations of a two-way mobile radio communication system which communicate with a different base station for each service zone, such as automobile and portable telephones.

In a mobile radio communication system such as an automobile telephone system, the zone in which a mobile station is allowed to communicate with one base station is limited according to the transmitting power of the radio wave used, and as shown in FIG. 1, for example, in the case of realizing a wide service area, a number of zones Z1, Z2, . . . , which have base stations B1, B2, . . . installed at their centers, are provided and in any zone mobile stations are allowed to be connected to a communication network via the base station of the zone and a switching system 30. The frequency band assigned to the entire mobile radio communication system consists of many equally spaced-apart radio channels, which are divided into control channels that are used for the base stations to specify channels to be used by mobile stations in their service zones and communication channels for communication use. To prevent radio communications in adjacent zones from interfering with each other, radio channels of different frequencies are assigned to the adjacent zone.

Now, assume that the total number of radio channels of the frequency band assigned to the mobile radio communication system is 100 and let the radio channels be represented by ch1, ch2, . . . , ch100, beginning with the lowest frequency channel. Let it be assumed, for example, that the channels ch1, ch2, . . . , ch10 are used as control channels, which are represented by CCh1, CCh2, . . . , CCh10 in FIG. 1. These control channels CCh1, CCh2, . . . , CCh10 are sequentially assigned one by one to the zones Z1, Z2, . . . in such a manner that the control channels in adjacent zones are not the same. Similarly, pluralities of communication channels are sequentially assigned to the zones Z1, Z2, . . . , respectively, in such a manner that the communication channels in adjacent zones are not the same. In the mobile radio communication system to which the present invention is applied, however, a channel, even if assigned as a control channel to a certain zone, is allowed to be used as a communication channel of another or other zones sufficiently remote therefrom not to suffer interference, so as to improve the frequency utilization efficiency. For instance, as shown in FIG. 1, while channels ch4, 5 and 11 through 20 are assigned as communication channels to the zone 1, the channels ch4 and ch5 are used as control channels CCh4 and CCh5 of the zones Z4 and Z5, respectively.

In a service area (including a plurality of zones) of a high traffic volume as in a big city, a control channel of a certain zone is used as one of the communication channels of another zone sufficiently remote therefrom to thereby increase the traffic volume that can be dealt with by the system.

In such a mobile radio communication system, mobile stations M1, M2, . . . each have prestored therein frequencies of all the control channels CCh1 through CCh10 of the entire system and in each mobile station, upon turning on the power, all the control channels CCh1 through CCh10 are sequentially swept to measure their receiving levels, and that one of the control channels which has the maximum level detected above a prescribed value is automatically selected as the control channel in the zone where the mobile station is currently present. For example, a call request from the mobile station M1 is sent via its selected control channel CCh3 to a base station B3, which, in turn, indicates to the mobile station M1 via the control channel CCh3 an idle one of the communication channels ch8, ch9 and ch31 through ch40 assigned to the zone Z3. The mobile station M1 automatically selects the thus specified channel and becomes ready for originating a call.

As mentioned above, upon turning on the power, the mobile station measures the receiving levels of all the control channels CCh1 through CCh10 one after another and selects the control channel to be used (CCh3 in the zone Z3). As long as the power supply is held ON thereafter and the mobile station remains in an incoming call waiting state, it repeatedly measures the receiving level of the channel being currently received, that is, the control channel CCh3 currently selected as described above. For example, as the mobile station M1 moves into the zone Z1 from the zone Z3 as indicated by the arrow in FIG. 1, the receiving level of the control channel CCh3 lowers. When the receiving level becomes lower than a prescribed value, the mobile station M1 measures again the receiving levels of all the control channels and selects the control channel of the maximum level (CCh1 in the zone Z1) among them. Such a measurement of the receiving level for each control channel requires, for instance, around 100 msec, and accordingly, one second or so is needed to measure the receiving levels of all the control channels.

Assume, for example, that a mobile station M2 staying in the same zone Z3 as the mobile station M1 is in communication over the channel ch8 when the mobile station M1 is to select the control channel CCh3 of the zone Z3 from all the control channels CCh1 through CCh10 as mentioned above. In this instance, the receiving levels of the channels ch8 as well as CCh3 are detected high in the search for the control channel by the mobile station M1; therefore, the method of merely selecting a channel of the maximum level incurs the possibility that the channel ch8 being occupied by the mobile station M2 is selected as the control channel by the mobile station M1. In such a case, the mobile station M1 cannot receive a control signal from the base station even if it waits for the mobile station M2 to end the communication. To avoid this, it is customary in the prior art not only to check the receiving level of the respective control channel but also to make a check to see if the signal that is received over the control channel has the format of a control signal.

It usually takes about one second to decide that a control signal of the normal format could be received. On the other hand, when such a normal control signal has not been received even after a certain elapsed time (two seconds, for instance), it is decided that no control signal has been received. When the received signal is decided not to be the normal control signal, it is judged that the received signal is a communication signal or disturbing signal and other channels of high receiving levels are similarly checked; that is, such channel checking is repeated until an available control channel is found.

As referred to above, a relatively large amount of time is needed for the mobile station to decide that the received signal is not a control signal, and hence under bad environmental conditions it takes much time for the mobile station to turn ON the power supply, select the control channel and then become ready for communication. Moreover, since no incoming call can be received during the control channel selection, the incoming call reception failure rate unavoidably increases. Where the mobile station is a portable telephone, it is designed so that the normal control channel reception takes place intermittently to reduce power dissipation, and a continuous power supply is needed during the control channel selection; hence, the more time the control channel selection takes, the more batteries are consumed and the more frequently they need to be charged.

SUMMARY OF THE INVENTION

It is therefore an object of the present invention to provide a control channel selecting method for mobile stations which reduces the time for the selection of a control channel to thereby improve the incoming call reception failure rate and increase the intermittent control channel reception rate, permitting the reduction of battery dissipation.

A control channel selecting method according to a first aspect of the present invention includes:

a first step of selecting candidate control channels;

a second step of making a check to see if the reception of a control signal is possible in each of said candidate control channels;

a third step wherein when it was decided in said second step that the reception of said control signal would be impossible, the number of control signal reception failures is incremented by 1 in respect of the corresponding candidate control channel;

a fourth step wherein said second and third steps are repeated and when said number of control signal reception failures has reached a predetermined positive integer M, the corresponding candidate control channel is eliminated;

a fifth step wherein when it was decided in said second step that the reception of said control signal would be possible, the corresponding control channel is selected.

A control channel selecting method according to a second aspect of the present invention includes:

a first step of selecting candidate control channels;

a second step of selecting those of said selected candidate control channels which are smaller than a prescribed value M in the number of control signal reception failures made so far;

a third step of making a check to see if the reception of a control signal is possible in said control channels selected in said second step; and a fourth step wherein when it was decided that the reception of said control signal would be impossible, said number of control signal reception failures in the corresponding candidate control channels is incremented by 1.

Thus, according to the present invention, since no check is made to see if the reception of a control signal is possible in the control channels eliminated from the candidates for selection, it is possible to reduce the time for selecting a correct or normal control channel.

DESCRIPTION OF THE PREFERRED EMBODIMENTS

Figure 2:
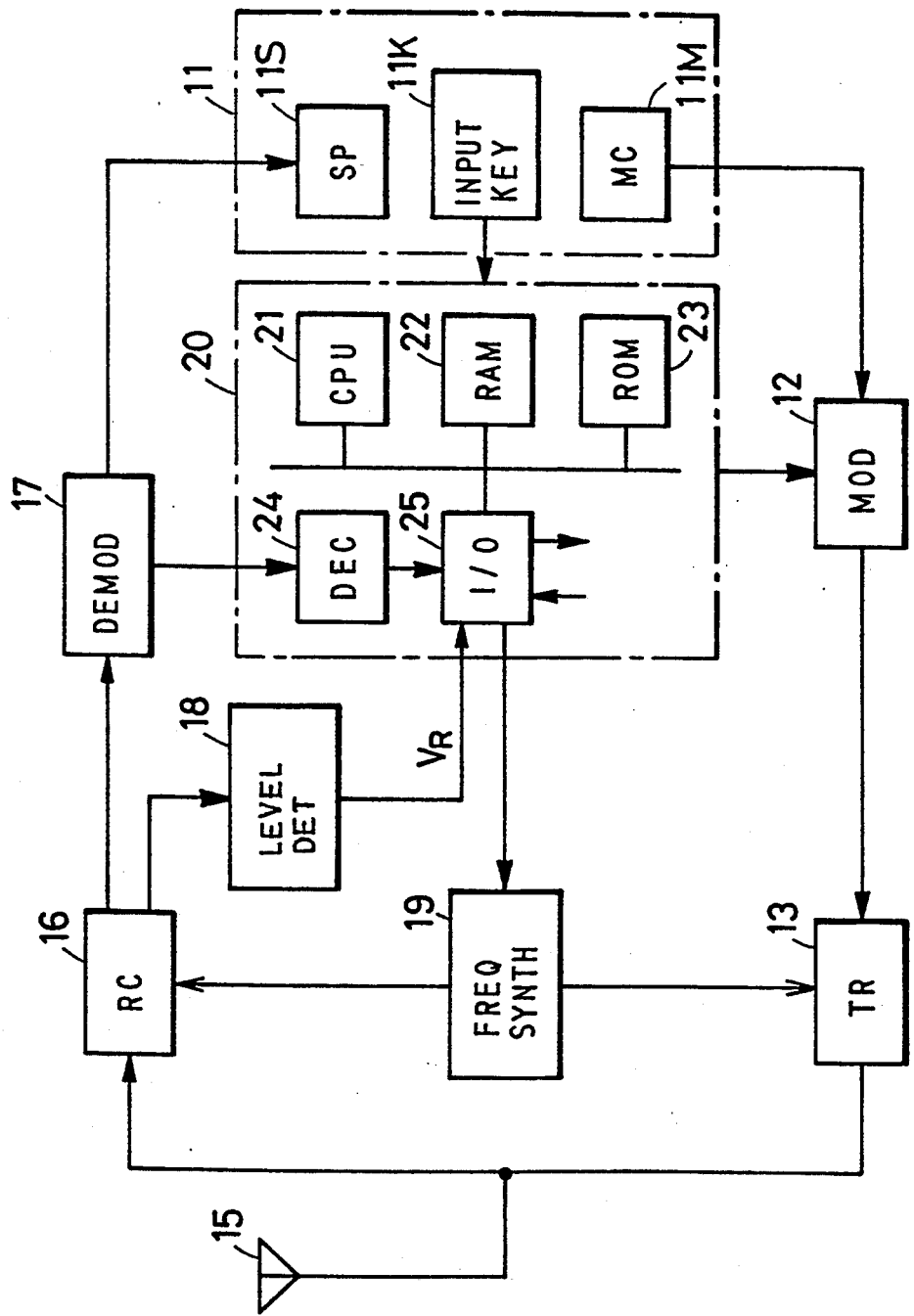
FIG. 2 is a block diagram illustrating an example of the device construction of a mobile station embodying the control channel selecting method according to the present invention.

FIG. 2 illustrates in block form an example of the construction of a mobile station to which the control channel selecting method of the present invention is applied. A telephone part 11 includes a speaker 11S, a dial (ten key) 11K and a microphone 11M. A transmission signal from the microphone 11M is applied to a modulator 12, wherein its intermediate frequency is modulated, and the modulated output is converted by a transmitter 13 to a high-frequency signal, which is transmitted as a radio wave from an antenna 15. On the other hand, a radio wave from a base station is received by the antenna 15 and fed to a receiver 16, wherein it is converted to an intermediate-frequency signal. The intermediate-frequency signal is demodulated by a demodulator 17 and the demodulated output is applied to the speaker 11S of the telephone part 11. A level detector 18 detects the receiving level $V_R$ of the channel being received by the receiver 16 and provides the detected output to a control part 20. Following the operation processing flow embodying the present invention, shown in FIG. 3 or 4, the control part 20 controls a frequency synthesizer 19 on the basis of the detected receiving level to select a control channel, set a communication channel designated by the base station, provide a control signal of a predetermined format for a call request to the modulator 12, or detect a predetermined control signal from the demodulated signal that is provided from the demodulator 17.

The control part 20 includes a central processing unit (CPU) 21, a RAM 22, a ROM 23, a decoder 24 and an input/output (I/O) device 25. The decoder 24 decodes a control signal that: is contained in the demodulated signal from the demodulator 17. The I/O device 25 fetches therein the detected receiving level $V_R$ from the level detector 18 and information from the input key (dial) 11K and provides a control signal and a channel select signal from the CPU 21 to the modulator 12 and the frequency synthesizer 19, respectively. The RAM 22 has an area for storing the number of control channel or signal reception failures (hereinafter referred to simply as the reception failure number, for the sake of brevity) m for each of all control channels CCh1 through CCh10. Upon each decision of a reception failure for the respective control channel, the reception failure number m in the corresponding area is incremented by 1. In the ROM 23 there is prestored a program describing an originating call processing procedure, an incoming call processing procedure, a channel switching procedure, etc., and the program contains a program that follows a process flow for carrying out the control channel selecting method of the present invention partly shown in FIG. 3 or 4. The CPU 21 follows the program to execute various processes.

Next, a description will be given, with reference to FIG. 3, of the application of the control channel selecting method according to the first aspect of the invention to the mobile radio communication system shown in FIG. 1.

Upon turning ON the power source of the mobile station in step S1, the areas of the RAM 22 for storing the reception failure numbers in all the control channels are cleared, and in step S2 the receiving levels $V_R$ of all the control channels CCh1 through CCh10 preset in the mobile station are detected one after another.

In step S3 it is checked whether there are control channels whose receiving levels $V_R$ are above a level $V_{th}$ prescribed by the system. If not, the process goes back to step S2, wherein the levels of all the control channels are measured again. The result of the check is "NO," for example, when the mobile station temporarily goes into an underground passage or tunnel or goes behind a mountain or building. If the result of the check in step S3 is "YES," then the process proceeds to step S4.

In step S4 a channel of the highest receiving level among the detected channels of the receiving levels above the prescribed value $V_{th}$ is selected.

In step S5 a check is made to see if a control signal is received correctly in the channel selected in step S4. Each base station always transmits control signals of a fixed frame length at regular time intervals. Each frame consists of a header of a predetermined pattern, provided at the beginning thereof, and the subsequent identification number of the base station and control information. For instance, when the control signal is one that specifies the communication channel for the mobile station, the specified communication channel number is inserted as the control information subsequent to the header, and when the control signal is a terminating control signal, the identification number (i.e. the telephone number) of a terminating or destination station is inserted as the control information. When the base station does not transmit any specific control information, the control information is a repetition of "0." Accordingly, the decoding of the header permits a decision that the received signal is a control signal. To reduce errors in this decision, it is preferable to decide that the reception of the control signal in the selected channel is impossible (i.e. bad reception or reception failure) in the case where the control signal cannot continuously be decoded over a long period of time T sufficiently longer than the frame length of the control signal. Yet the period T may also be selected about the same as or several times longer than the frame length. When the control signal cannot be decoded within the predetermined period of time T (two seconds, for example) in step S5, then it is decided that the reception of the control signal is bad (or impossible), and the process proceeds to step S6.

In step S6 the reception failure number m (initialized to "0") at the address position in the RAM 22 in FIG. 2, corresponding to the control channel decided as having failed to receive the control signal, is incremented by "1" and thus updated, and the process proceeds to step S7.

In step S7 a check is made to see if a channel of the second highest receiving level $V_R$ is present. If such a channel is found, then the channel is selected in step S8 and the process goes back to step S5 to check whether the control signal can correctly be received in that channel.

Where it is decided in step S7 that none of the control channels has the receiving level exceeding the predetermined value $V_{th}$ above which the control signal can correctly be received, the process proceeds to step S9.

In step S9 the reception failure numbers m of the respective control channels are read out of the corresponding address areas of the RAM 22. The control channel whose reception failure number m has already reached a predetermined value M is decided as being used as a communication channel in the zone in which the mobile station is currently present, and this channel is eliminated from control channel candidates. Then the receiving levels $V_R$ of the other control channels are measured, after which the process proceeds to step S10.

In step S10 it is checked whether the receiving level $V_R$ of each of the control channels measured in step S9 exceeds the predetermined value $V_{th}$, and if there is found one or more control channels of the receiving levels exceeding the value $V_{th}$, the process proceeds to step S4, whereas if such a control channel is not found, the process goes back to step S9.

In this way, the channels whose receiving levels $V_R$ exceed the system prescribed value $V_{th}$ are checked, in a decreasing order of level, as to whether the control signal can correctly be received. If there exists a channel decided in step S5 as being possible of correct reception of the control signal, the process proceeds to step S11.

In step S11 a check is made to see if the zone of the mobile station after the channel selection is the same as the zone before the channel selection, and if so, it is decided that the mobile station is still in the same zone, after which the process proceeds to step S12 in which the mobile station enters an incoming call waiting state. If it is decided in step S11 that the zone of the mobile station is different from the zone immediately before the channel selection, then it means that the mobile station has moved into a new zone, and consequently, the process proceeds to step S13. Whether or not the mobile station still remains in the same zone as that prior to the channel selection can be decided, for example, by checking whether or not the control channel decided in step S5 as being possible of correct reception of the control signal is the same as the control channel immediately prior to the channel selection, or whether or not the base station indicated by the control signal of the control channel received so far is the same as the base station indicated by the control signal of the currently selected control channel.

In step S13 the mobile station resets to zero all the reception failure numbers m in the areas of the RAM 22 corresponding to all of the control channels, after which the mobile station enters the incoming call waiting state in step S12. By this reset, all the control channels CCh1 through CCh10 are made subject to the selection of a control channel in the new zone.

In step S12 wherein the mobile station is in the incoming call waiting state, a check is made in step S12A to see if the control signal of the selected control channel cannot correctly be decoded over a predetermined period of time. If so, there is the possibility of the mobile station having moved into the adjoining zone or an underground passage, and hence the process proceeds to steps S9 and S10, in which the receiving levels $V_R$ of the control channels other than those of m=M are measured. If a control signal is received correctly in step S12A, the process proceeds to step S12B, wherein a check is made to see if an incoming call is present. If not, the process goes back to step S12A, whereas if an incoming call is received, the process proceeds to step S14, in which the mobile station enters into communication.

Thus, in the case where the state in which the control signal could not be correctly received has reached M times for the same control channel, this control channel is excluded from the candidates for the control channel in the zone where the mobile station is currently staying. That is, the control channel decided as being impossible of correct reception of the control signal is not subject to the detection of the receiving level in step S9 and the check in step S5 as to whether or not the control signal can correctly be received; hence, the control channel selection time is reduced accordingly. In FIG. 3 it is steps S6, S9, S10 and S13 that are added to the conventional control channel selecting process according to the present invention.

Figure 4:
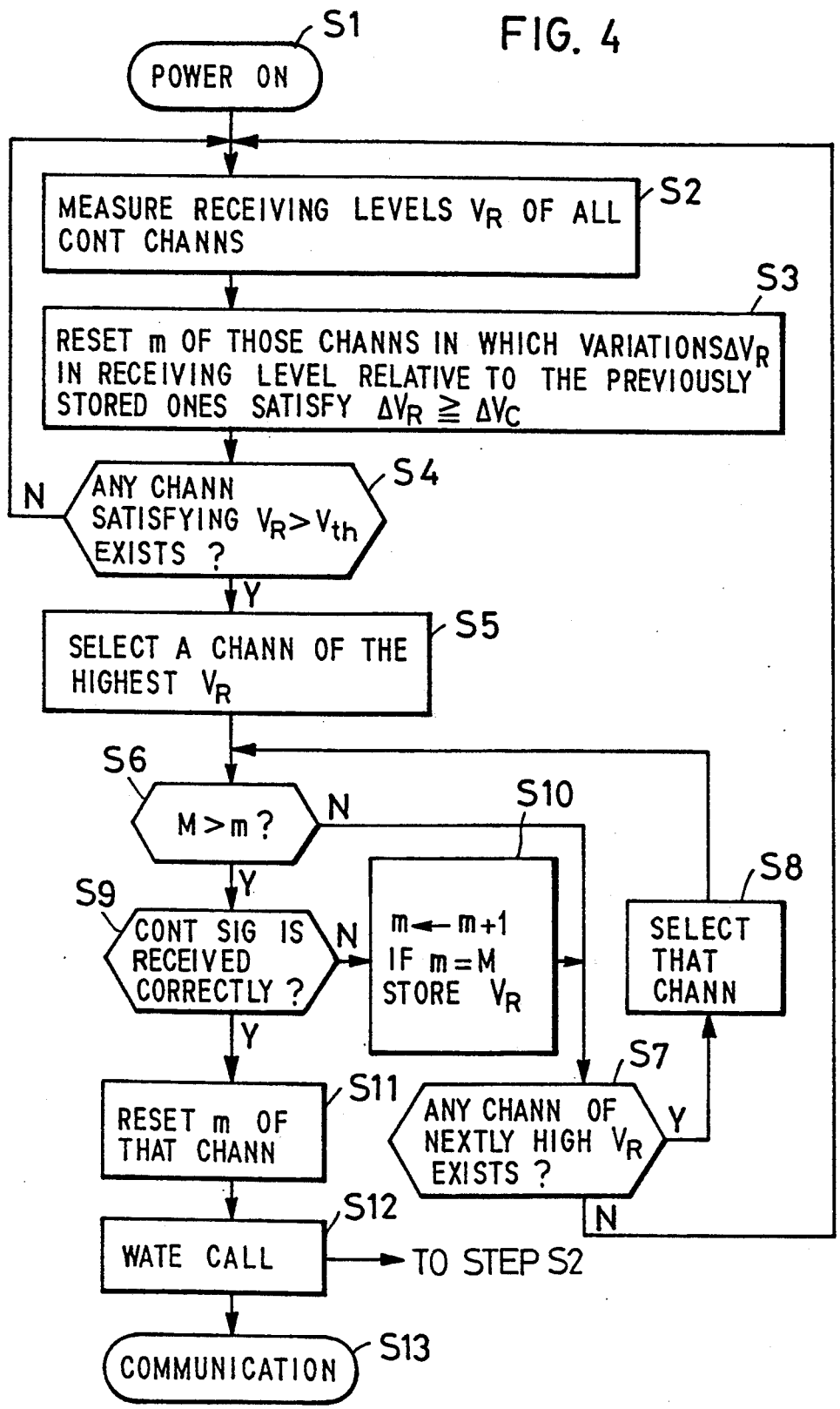
FIG. 4 is a process flowchart of a second embodiment according to the present invention.

Turning next to FIG. 4, a second embodiment of the present invention will be described. In this embodiment there are provided in the RAM 22 (FIG. 2) areas for writing the receiving levels $V_R$ of the control channels CCh1 through CCh10 as well as the aforementioned areas for writing the reception failure numbers of the control channels as in the first embodiment.

Upon turning ON the power source of the mobile station in step S1, the storage areas for the reception failure numbers m and the receiving levels $V_R$ in the RAM 22 are all cleared, after which in step S2 the receiving levels of the control channels CCh1 through CCh10 are measured.

In step S3 the absolute value $\Delta V_R$ of the difference between the receiving level $V_R$ measured in step S2 and the level $V_R$ having been stored in the corresponding storage area of the RAM 22 when the reception failure number m reached the predetermined value M is compared with a predetermined value $\Delta V_c$ for each channel. If the value $\Delta V_R$ is equal to or greater than $\Delta V_c$, then the reception failure number m in the area of the RAM 22 corresponding to that channel is reset to zero, and if the above-mentioned absolute value $\Delta V_R$ is smaller than the predetermined value $\Delta V_c$, the reception failure number m is held unchanged.

In step S4 the receiving levels $V_R$ measured in step S2 are checked for control channels of the receiving levels $V_R$ above the prescribed value $V_{th}$. If there are found such control channels, the process proceeds to step S5, and if not, then the process goes back to step S2.

In step S5 a selection is made of a control channel of the highest receiving level $V_R$ among the control channels whose receiving levels $V_R$ are above the prescribed value $V_{th}$.

In step S6 a check is made to see if the reception failure number m of the selected control channel is smaller than the predetermined value M. If the value m has reached M, the control channel is regarded as being used as a communication channel or as receiving a disturbing wave, and the control channel is discarded. After this, the process proceeds to step S7, wherein a control channel of the second highest receiving level $V_R$ is selected and if its reception failure number m is smaller than the predetermined value M, this control channel is selected and the process proceeds to step S9.

If no control channel of the second highest receiving level $V_R$ above the predetermined value $V_{th}$ is found in step S7, then the process goes back to step S2, starting again the measurement of the receiving levels of all the control channels. When a control channel of the second highest receiving level $V_R$ above the prescribed level $V_{th}$ is found, the process proceeds to step S8 to select that control channel and then goes back to step S6. In this way, the control channel of the receiving level $V_R$ above the prescribed value $V_{th}$ and the reception failure number m smaller than the prescribed value M is selected and the process proceeds to step S9.

In step S9 a check is made to see if the control signal can correctly be received in the control channel selected in step S5 or S7. This check is made in the same manner as described previously in respect of step S5 shown in FIG. 3. Where the control signal cannot correctly be received, the process proceeds to step S10, in which the reception failure number m of the control channel concerned in the RAM 22 is incremented by one and if the reception failure number m reaches the predetermined value M, the receiving level $V_R$ of that control channel is written into the corresponding area of the RAM 22 and the process proceeds to step S7.

Where it is decided in step S9 that the control signal can correctly be received, the process proceeds to step S11, in which the reception failure number m of that control channel in the RAM 22 is cleared to zero, after which the process proceeds to step S12 in which the mobile station enters the incoming call waiting state in that control channel. The incoming call waiting operation is also the same as in step S12 shown in FIG. 3. Upon occurrence of an incoming call, the process proceeds to step S13 in which the mobile station enters into communication. Where the receiving level $V_R$ of the control channel becomes lower than the predetermined value $V_{th}$ while the mobile station is in the incoming call waiting state, the process returns to step S2. The reason for resetting the reception failure number m in the RAM 22 corresponding to the control channel finally selected in step S11 is that in the case where the receiving level $V_R$ temporarily drops too much to decode the control signal in the incoming call waiting state in the subsequent step S12 and the process goes back to step S2, the mobile station is very likely to stay in the same zone, and hence the selected control channel is held as one of candidates to be selected next.

As described above, even if a channel assigned as a control channel to another zone is used as a communication channel, steps S2 through S10 are repeated and the reception of the control signal is tried M times, after which the receiving level of that channel is measured in step S2 but the channel is not selected as a control channel candidate in step S6—this permits rapid selection of an optimum control channel.

Figure 1:
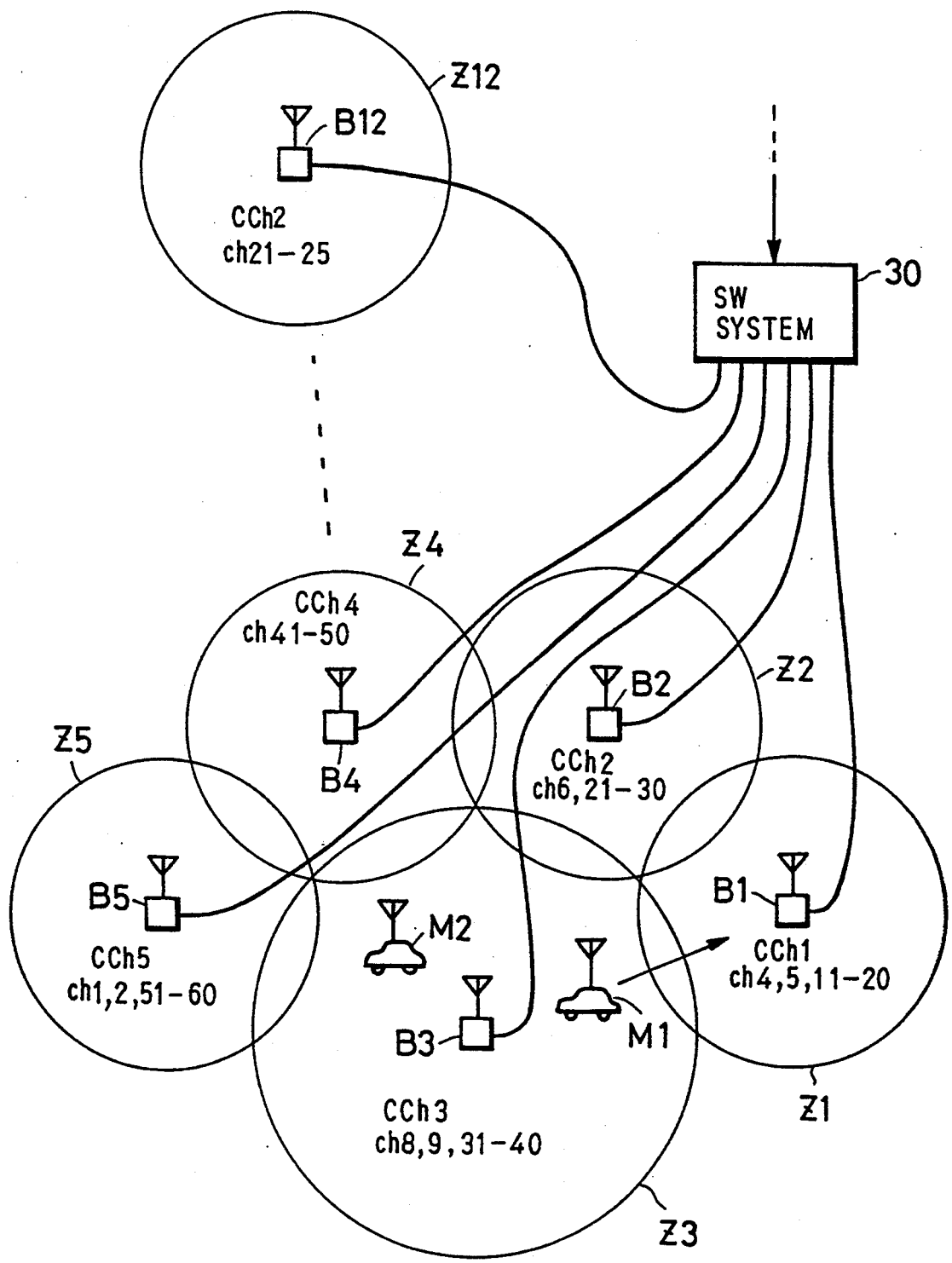
FIG. 1 is a diagram for explaining a conventional mobile radio communication technique.
Figure 5:
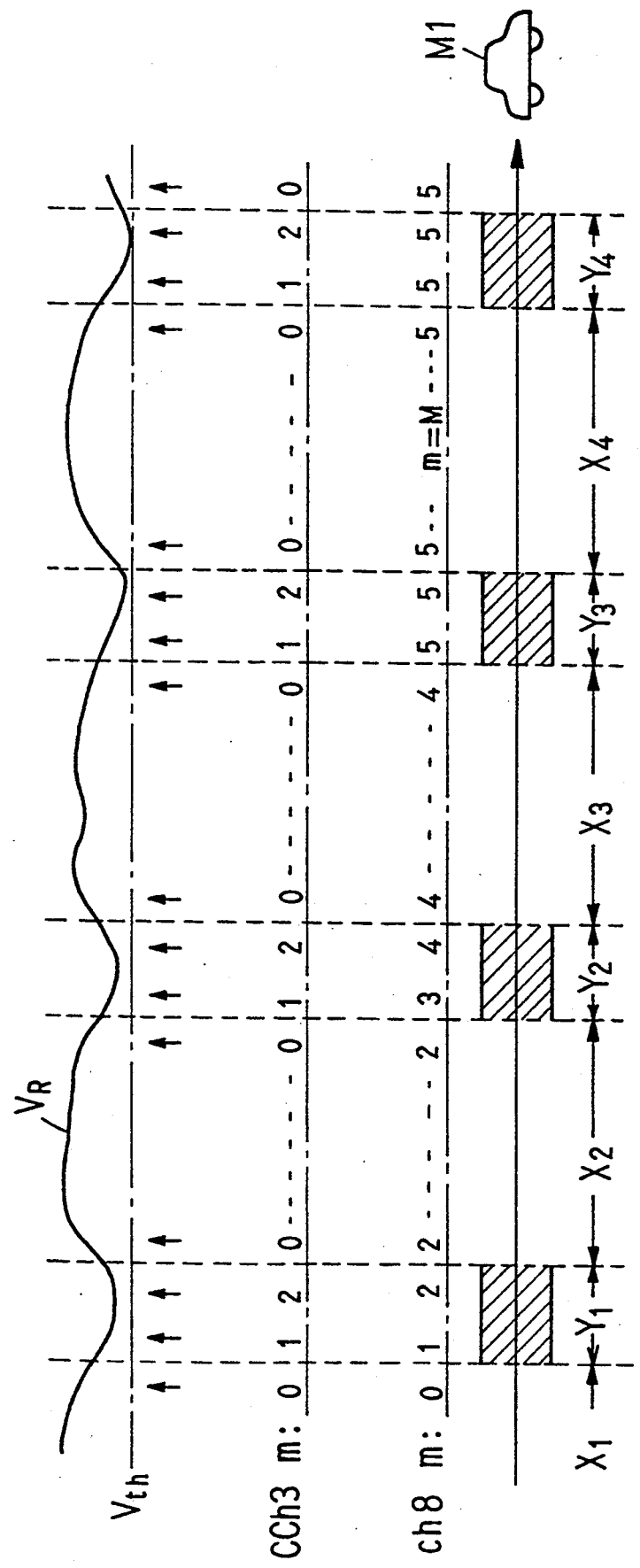
FIG. 5 is a timing chart showing an example of operations following the control channel selection processing in FIG. 4.

FIG. 5 shows an example of the control channel selecting process of FIG. 4 which is performed, for example, in the case where the mobile station M1 in FIG. 1 repeatedly goes behind buildings and out from behind them or goes into and out of short tunnels or underground passages while travelling in the same zone Z3. Reference characters $X_1$, $X_2$, $X_3$ and $X_4$ indicate sections where no obstacle is present, and $Y_1$, $Y_2$, $Y_3$ and $Y_4$ represent sections where the mobile station is behind buildings or in short tunnels or underground passages. In this example, let it be assumed that receiving levels $V_R$ of the control channel CCh3 of the zone Z3 and its communication channel ch8 (that can be selected as a candidate for a control channel) undergo substantially the same variation as shown in FIG. 5, that the receiving levels $V_R$ remain above the predetermined value $V_{th}$ even in the sections $Y_1$, $Y_2$, $Y_3$ and $Y_4$ in which they drop, and that when the mobile station M1 goes out of these sections, the receiving levels $V_R$ do not vary to such an extent as to cause resetting in step S3.

In the section $X_1$ the mobile station M1 is in the state of step S12 wherein it awaits an incoming call in the control channel CCh3, and when the mobile station goes into the section $Y_1$, the process proceeds to step S2. By repeating steps S2 through S10, the reception failure numbers m of the both channels CCh3 and ch8 are incremented as shown in FIG. 5. When the mobile station M1 goes out of the section $Y_1$ and into the section $X_2$, the control signal of the control channel CCh3 can correctly be decoded in step S9, and hence in step S11 the reception failure number m corresponding to that channel is reset to zero and then the mobile station M1 enters the incoming call waiting state in step S12, but the reception failure number m=2 of the channel ch8 is not reset and is held unchanged. Following this, as shown in FIG. 5, the reception failure number m of the control channel CCh3 is reset upon each recovery of the receiving level $V_R$ and the channel CCh3 is always held as a candidate for selection in the next control channel selecting process. On the other hand, the reception failure number m of the channel ch8 increases sequentially, and in this example, when the reception failure number m reaches the predetermined value M=5, the channel ch8 is excluded from the group of control channel candidates in step S6. Accordingly, the time for selecting the control channel CCh3 in the section $X_4$ and the subsequent sections is reduced.

Figure 6:
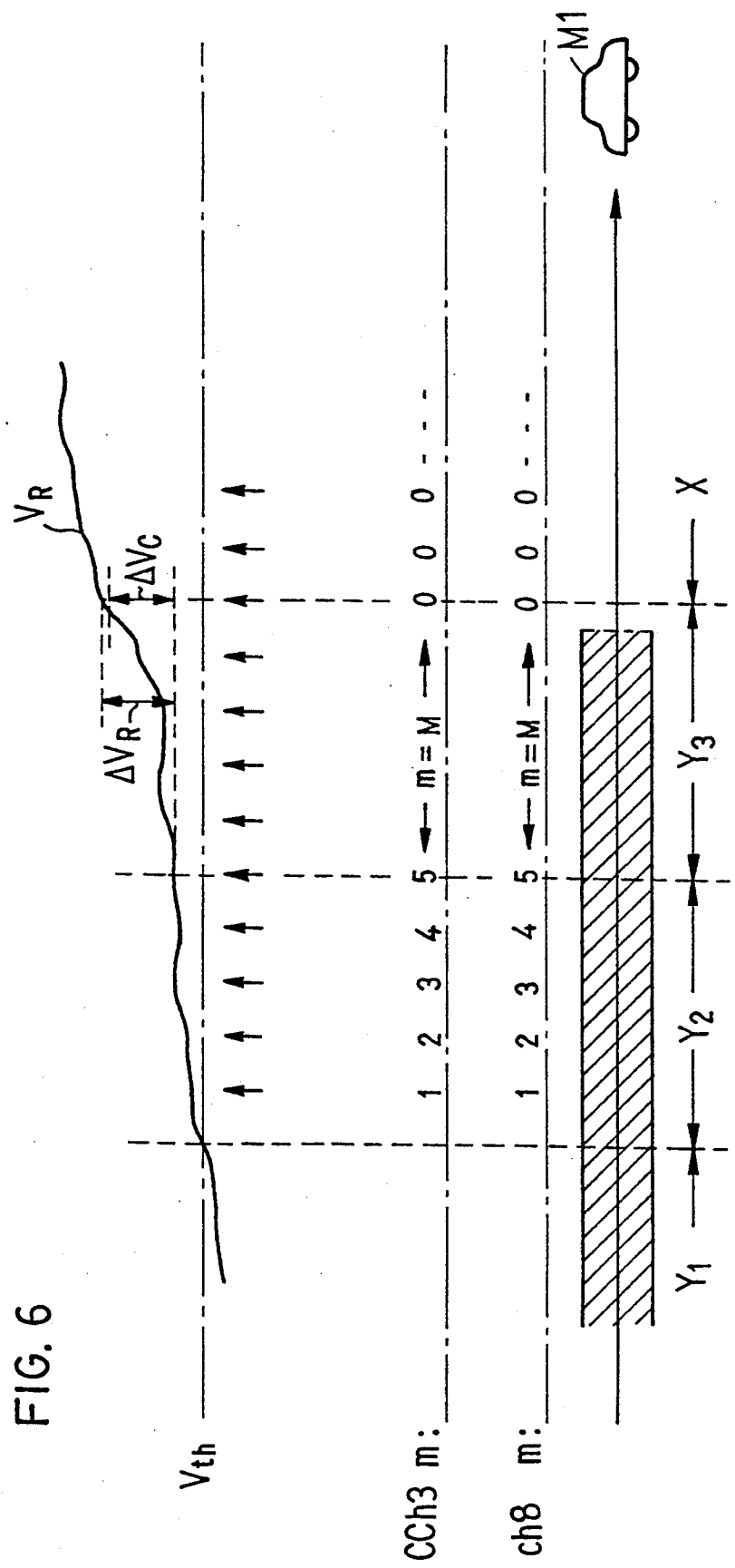
FIG. 6 is a timing chart showing another example of operations following the control channel selection processing in FIG. 4.

FIG. 6 shows, by way of example, how the control channel selecting process in FIG. 4 is performed when the mobile station M1 goes out of, for example, a long underground passage in the same zone Z3. In the section $Y_1$ where the receiving level $V_R$ is lower than the predetermined value $V_{th}$, steps S2, S3 and S4 are repeated. As shown at the beginning of the section $Y_2$, when the receiving level $V_R$ exceeds the predetermined value $V_{th}$ as the mobile station approaches an exit of the underground passage, the process proceeds to step S9, but since the receiving level $V_R$ is not sufficiently high yet, the control signal cannot correctly be decoded and the reception failure number m for each of the control channel CCh3 and the communication channel ch8 increases as depicted in FIG. 6. When the reception failure number m reaches the predetermined value M in step S10 as shown at the start of the section $Y_3$, the receiving levels $V_R$ of the channels CCh3 and ch8 are written into the RAM 22 and in step S6 both channels are excluded as candidates for selection. Accordingly, the reception failure numbers m of both channels are held at the value M. The receiving level $V_R$ further increases and when its variation $\Delta V_R$ relative to the receiving level $V_R$ previously written into the RAM 22 exceeds the predetermined value $\Delta V_c$ as shown at the beginning of the section X, the reception failure numbers m in the RAM 22 corresponding to the channels CCh3 and ch8 are reset in step S3. Next, when the channel CCh3 is selected in step S5, the process proceeds via steps S6, S9 and S11 to step S12, in which the mobile station M1 enters the state of waiting for an incoming call in the control channel CCh3.

Figure 3:
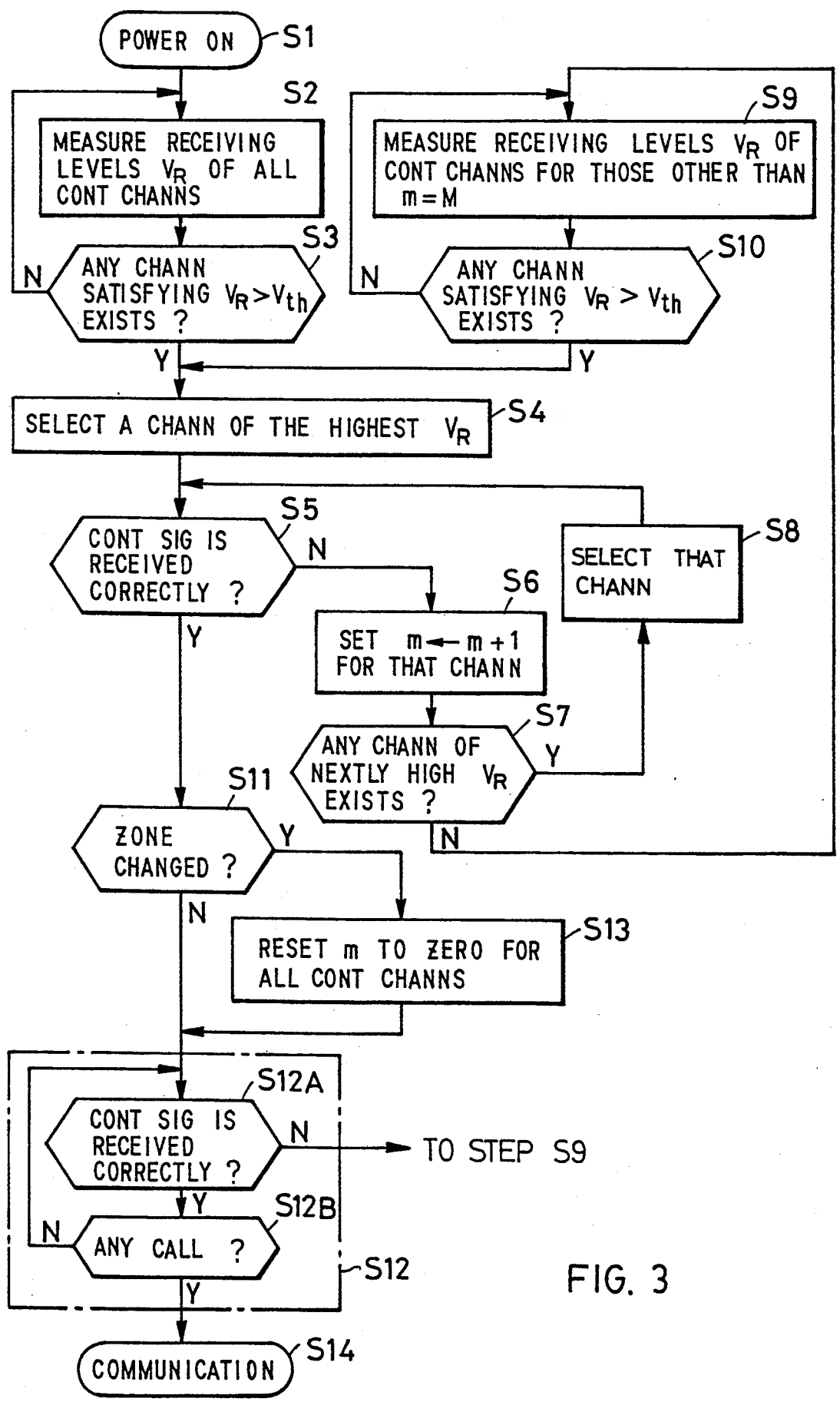
FIG. 3 is a process flowchart of a first embodiment according to the present invention.

In the embodiments of FIGS. 3 and 4 the prescribed value M may be 1. Where the prescribed value M is 2 or greater, channels may also be excluded from the group of control channel candidates when the reception failure occurs continuously.

As described above, the present invention reduces the control channel selection time immediately after turning ON the power source and the time for performing the necessary process when the mobile station moves from one radio-zone to another while waiting for an incoming call, and hence the incoming call reception failure rate is improved accordingly. Moreover, in the case of suppressing the consumption of batteries by effecting intermittent reception during the call waiting time in a portable telephone or the like, the intermittent reception rate increases, permitting reduction of the dissipation of batteries.

Furthermore, even if there exists a channel in which the reception of the control signal is bad, it is excluded from the group of control channel candidates, and thus the frequency assigned as a control channel can be used for a communication channel—this permits efficient utilization of frequencies.

What is claimed is:

1. A control channel selecting method in a mobile radio communication system, in which a service area includes a plurality of radio zones each having at least one base station and is assigned a set of at least one communication channel and at least one control channel, and a mobile station in an arbitrary one of said radio zones is receiving a current control channel and is connected to a communication network via said base station of said arbitrary radio zone, said method comprising the steps of:
   (1) selecting control channel candidates;
   (2) checking said selected control channel candidates to determine whether or not the reception of a control signal is possible in each of said selected control channel candidates;
   (3) when it was decided in said step (2) that the reception of said control signal would be impossible, the number of control signal reception failures in the corresponding control channel candidate is incremented by 1;
   (4) repeating said steps (2) and (3) and when said number of control signal reception failures corresponding to any one of said control channel candidates reaches a predetermined positive integer M, the corresponding control channel candidate is excluded from said selected control channel candidates; and
   (5) when it was decided in said step (2) that the reception of said control signal would be possible, the corresponding channel candidate is selected as a new control channel to be used for awaiting a call.

2. The method of claim 1, wherein said step (5) includes the steps of:
   (6) checking whether or not a new radio zone to which said new control channel belongs is the same as said arbitrary radio zone to which said current control channel belongs; and
   (7) when it was decided in said step (6) that said new radio zone is not the same as said arbitrary radio zone, said control channel candidate excluded in said step (4) is recovered as a control channel candidate.

3. The method of claim 1 or 2, wherein said step (1) includes: a step of measuring the receiving level of each of said control channel candidates; and a step of selecting those of said control channel candidates whose receiving levels exceed a predetermined level.

4. A method of effecting a control channel selection by a mobile station in a mobile radio communication system, in which a service area includes a plurality of radio zones each having at least one base station and assigned a set of at least one communication channel and at least one control channel, and a mobile station in an arbitrary one of said radio zones is receiving a current control channel and is connected to a communication network via said base station of said arbitrary radio zone, said method comprising the steps of:

(1) clearing failure number storage areas in a memory used by the mobile station for storing numbers of signal reception failures corresponding to respective control channels;

(2) measuring receiving levels of all control channels;

(3) selecting control channel candidates from said control channels based on the measured receiving levels;

(4) selecting one of said control channel candidates;

(5) deciding whether or not the number of signal reception failures of the selected control channel candidate in the corresponding one of said failure number storage areas is smaller than a predetermined value M, M being a positive integer;

(6) if it is decided in said step (5) that the number of signal reception failures is not smaller than said predetermined value M, checking whether there is another control channel candidate which has not been selected in said step (4);

(7) if it is decided in said step (6) that there is another control channel candidate, selecting said another control channel candidate and returning to said step (5);

(8) if it is decided in said step (6) that there is no other control channel candidate, returning to said step (2);

(9) if it is decided in said step (5) that the number of signal reception failures is smaller than said predetermined value M, checking whether the reception of a control signal is possible in said selected control channel candidate;

(10) when it is decided in said step (9) that the reception of said control signal would be impossible, incrementing by 1 the number of control signal reception failures of the selected control channel candidate in the corresponding one of said failure number storage areas and returning to said step (6); and

(11) when it is decided in said step (9) that the reception of said control signal would be possible, determining that the corresponding control channel candidate is to be used as a new control channel for awaiting a call, resetting the corresponding number of control signal reception failures, and returning to said step (2).

5. The method of claim 4, wherein said memory includes level storage areas in correspondence with respective ones of said control channels, and when the number of signal reception failures reaches said predetermined value M, the receiving level in the selected control channel candidate is written into the corresponding one of said level storage areas in said step (10); and said step (2) includes steps of resetting the number of signal reception failures in respect of a control channel in which the absolute value of a difference between the receiving level of said control channel measured in said step (2) and the receiving level of said selected control channel candidates stored in the corresponding one of said level storage areas is greater than a predetermined value, and recovering said control channel as a control channel candidate.

6. The method of claim 5, which includes a further step wherein, when it was decided in said step (9) that the reception of said control signal would be possible, the number of signal reception failures of the selected control channel candidate, stored in said memory, is reset.

* * * * *